United States Patent
Spillner et al.

(10) Patent No.: US 6,236,178 B1
(45) Date of Patent: May 22, 2001

(54) METHOD FOR LIMITING THE HYDRAULIC MAXIMUM PRESSURE OF A POWER-ASSISTED STEERING SYSTEM

(75) Inventors: Robert Spillner, Düsseldorf; Mathias Seidel, Neuss, both of (DE); Dave Vile, Bicester (GB)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/291,220

(22) Filed: Apr. 13, 1999

(30) Foreign Application Priority Data

Apr. 23, 1998 (DE) .............................. 198 18 139

(51) Int. Cl.⁷ .................................................. B62D 5/04
(52) U.S. Cl. ....................... 318/432; 318/434; 318/433; 318/489; 180/79.1; 180/421; 180/442; 180/443
(58) Field of Search .................. 318/139, 430–439, 318/280–293; 180/142, 79.1, 143, 141, 132, 442, 443, 417; 364/424.05, 424.051, 424.052

(56) References Cited

U.S. PATENT DOCUMENTS

| | | | |
|---|---|---|---|
| 4,828,066 | * | 5/1989 | Hayashi ............................. 180/142 |
| 5,029,660 | * | 7/1991 | Raad et al. ......................... 180/143 |
| 5,467,281 | * | 11/1995 | Iwashita et al. ................. 364/424.05 |
| 5,737,223 | * | 4/1998 | Matsuoka ...................... 364/424.051 |
| 5,762,159 | * | 6/1998 | Matsuoka et al. .................. 180/422 |
| 5,844,387 | * | 12/1998 | Mukai et al. ...................... 318/432 |
| 5,894,206 | * | 4/1999 | Noro et al. ....................... 318/433 |
| 5,936,379 | * | 8/1999 | Matsuoka ......................... 318/810 |
| 5,967,253 | * | 10/1999 | Collier-Hallman ................ 180/421 |
| 5,982,137 | * | 11/1999 | Endo ................................. 318/812 |

FOREIGN PATENT DOCUMENTS

| | | |
|---|---|---|
| 3920862 | 1/1991 | (DE) . |
| 3309214 | 7/1993 | (DE) . |
| WO9511152 | 4/1995 | (WO) . |

* cited by examiner

*Primary Examiner*—Paul Ip
(74) *Attorney, Agent, or Firm*—Tarolli, Sundheim, Covell, Tummino & Szabo L.L.P.

(57) ABSTRACT

The object of the present invention is to provide a method for limiting the hydraulic maximum pressure of a power-assisted steering system, which permits effective pressure limitation and thus protects the individual elements of the power-assisted steering system, i.e., a pressure limitation not far above the desired maximum operating pressure, but on the other hand does not require an overdimensioning of the individual segments of the power-assisted steering system. To solve this technical problem, the invention proposes a method for limiting the hydraulic maximum pressure of a power-assisted steering system whose hydraulic pump is driven by an electric motor characterized in that an upper limit value for the hydraulic maximum pressure is predefined, a limit value for the maximum current input is calculated therefrom, the generated current input of the electric motor is measured and, if the upper limit value is exceeded, the hydraulic flow is limited through the current input by reducing the speed of the electric motor.

8 Claims, 1 Drawing Sheet

METHOD FOR LIMITING THE HYDRAULIC MAXIMUM PRESSURE OF A POWER-ASSISTED STEERING SYSTEM

FIELD OF THE INVENTION

The present invention relates to a method for limiting the hydraulic maximum pressure of a power-assisted steering system whose hydraulic pump is driven by an electric motor.

BACKGROUND OF THE INVENTION

Electrohydraulic power-assisted steering systems of the generic class are well known. A power-assisted steering valve is directly or indirectly coupled with a vehicle steering wheel and put under hydraulic pressure. On torsion, the hydraulic pressure is guided to one or the other side of a steering gear and provides steering power assistance. The hydraulic pressure is provided by a hydraulic pump, which in turn is driven by an electric motor.

Typically, the electric motor runs at a predefined speed, which in turn ensures a corresponding speed of the hydraulic pump and thus provides a desirable operating pressure. As a function of the steering rate and the steering torque, a hydraulic flow under operating pressure is produced, which effects the described power assistance. The obtained operating pressure is in direct proportion to the current input to the electric motor.

In such power-assisted steering systems it is desirable in principle that the pressure should not significantly exceed the actual maximum operating pressure. This makes it possible to design all valves, connections, lines and the like of the power-assisted steering system for the respective pressure and thus ensures the cost-effectiveness of the power-assisted steering system as a whole due to the use of economically selected components. An uncontrolled increase in operating pressure would make it necessary to select overdimensioned individual elements so that the power-assisted steering system could no longer be economically produced.

Prior art limits the pressure in upward direction by using so-called pressure control valves. These are valves opening under hydraulic pressure, which open a bypass and thus prevent overpressure on other components of the power-assisted steering system.

It is known that the closer the opening range of the pressure control valve to the maximum operating pressure and the more precise the opening of the pressure control valve, the higher the corresponding production costs. Pressure control valves, which respond when the maximum operating pressure is exceeded by approximately 5%, are relatively large and costly components but are very stable in operation.

In contrast, another type of pressure control valve, whose opening range is approximately 20% above the desired maximum operating pressure, has become generally accepted in practice so that the valves are smaller and less expensive to produce. A disadvantage of these valves is that they are stable only if the valve characteristic is flat. These pressure control valves, which are not as sensitive as the first mentioned valves, require, however, that the other elements of the power-assisted steering system be dimensioned accordingly.

SUMMARY OF THE INVENTION

Thus, there is a basic need for optimizing pressure control in a power-assisted steering system to permit a cost-effective design.

Purely electrical pressure control is not feasible since an electric motor, if switched off, would not only produce no speed but also no torque, which is not practically possible.

Based on this state of the art, the object of the present invention is to provide a method for limiting the hydraulic maximum pressure of a power-assisted steering system, which permits an effective pressure control and thus protects the individual elements of the power-assisted steering system, i.e., a pressure limitation not far above the desired maximum operating pressure, but on the other hand does not require overdimensioning of the individual segments of the power-assisted steering system.

To attain this object, the invention proposes a method for limiting the hydraulic maximum pressure of a power-assisted steering system whose hydraulic pump is driven by an electric motor, characterized in that a limit value for the hydraulic maximum pressure is predefined, a limit value for the maximum current input is calculated therefrom, the generated current input of the electric motor is measured, and if the upper limit value is exceeded, the hydraulic flow is limited through the current input by reducing the speed of the electric motor.

This technical solution according to the invention makes it possible to select the entire system, i.e., each pressurized element such as components, connections, seals and the like, in such a way as to obviate overdimensioning. In addition, smaller and cost-effective pressure control valves may be used whose opening range is comparatively roughly above the desired maximum working pressure, which results in an economic overall system design. Controlling the speed of the electric motor makes it possible to reduce the hydraulic flow while maintaining pressure such that when the upper pressure limit value is reached the speed reduction of the electric motor will not cause any appreciable pressure loss with respect to the operating pressure, but the hydraulic pressure will again fall below the maximum pressure. Combining the method according to the invention with pressure control valves of the described type makes it possible to obtain a narrow hydraulic operating range by simple means without additional economic or component costs.

The maximum pressure is preferably determined in the range between the desired maximum operating pressure and the maximum pressure of the opening range of the pressure control valve, particularly preferably somewhat above the desired operating pressure, e.g., 5% or higher. According to one proposal of the invention, the upper limit value for the maximum pressure is adjustable such that the same control unit can be used as a function of the respective steering system.

Within the context of the invention, different control types may be used. For example, when the upper limit value for the hydraulic maximum pressure is reached, a predetermined speed reduction may occur, which is raised again to the normal speed when a limit value is reached. Also possible are incremental controls as well as a predefined continuous speed control curve. Furthermore, the control curves during speed reduction may differ from the control curves during speed increase.

According to a particularly advantageous proposal, speed control is advantageously realized through current control by pulse width modulation. Changing the width of the current pulses is a simple way to change the speed of an electric motor.

Finally, the invention proposes to monitor and take into account additional control parameters when using the inventive method. Thus, according to an advantageous proposal of the invention, a limit value can be defined for the steering rate and the actual steering rate determined and monitored. Reduction of the actual pressure through reduction of the electric motor speed can be activated only below a limit value for the steering rate whereby it is assumed that above this limit value, i.e., at a very high steering rate, unimpeded steering assistance is absolutely necessary.

The invention results in additional advantages in that it significantly reduces the hydraulic power loss in the steering stop. At the same time, it has been shown that the noise generated by the power-assisted steering system is significantly reduced since the tendency toward instability is decreased due to the reduced hydraulic pressure within the pressure control valve.

Steering systems according to the generic class operate, for example, at a pressure of 100 bar.

BRIEF DESCRIPTION OF THE DRAWING

Additional advantages and features of the invention will become evident from the following description by means of the figures.

DESCRIPTION OF THE INVENTION

Figure 1:
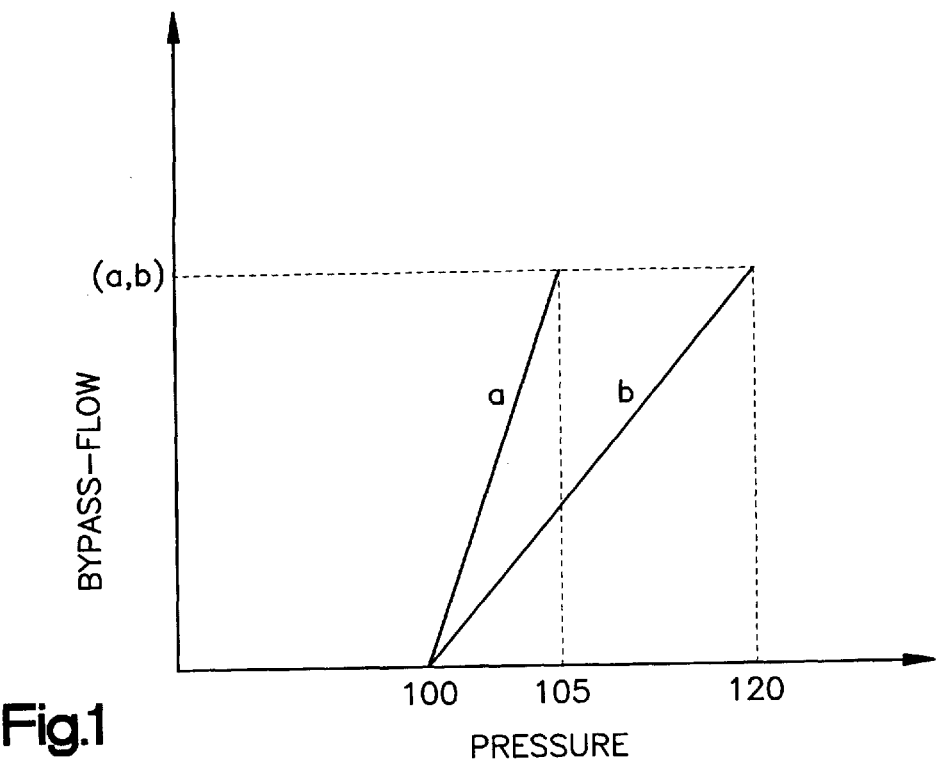
FIG. 1 is a graph of the bypass flow above pressure for pressure control valves.

FIG. 1 shows a graph of the bypass flow above pressure. As explained above, steering systems of the generic class operate, for example, at a pressure of 100 bar. With the use of large and costly pressure control valves, the valves open at a pressure of 100 bar resulting in the bypass flow characteristic (a). With the use of smaller, cost-effective pressure control valves, valve opening can be achieved only at 120 bar, which results in curve (b).

Figure 2:
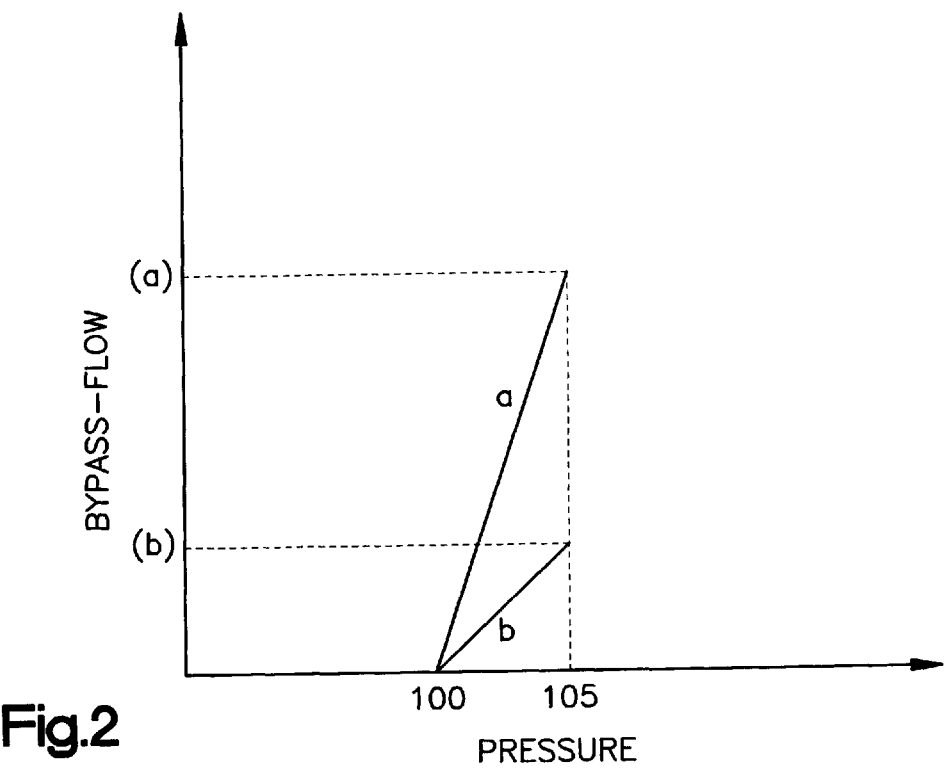
FIG. 2 shows the bypass flow above pressure at reduced bypass flow according to the invention.

In contrast, FIG. 2 shows that reducing the bypass flow by reducing the speed of the electric motor when a limit value is exceeded results in a bypass flow according to curve (b), which is comparable to using large, costly pressure control valves according to curve (a). With little economic cost the invention achieves good results.

What is claimed is:

1. Method for limiting the hydraulic maximum pressure of a power-assist steering system whose hydraulic pump is driven by an electric motor characterized in that:

an upper limit value for the hydraulic maximum pressure is predefined, the upper limit value for the hydraulic maximum pressure is determined above a maximum operating pressure but below a maximum opening pressure of a pressure control valve a limit value for the maximum current input is calculated therefrom, the generated current input of the electric motor is measured, and if the upper limit value is exceeded, the hydraulic flow is limited through the current input by reducing the speed of the electric motor.

2. Method according to claim 1 characterized in that the upper limit value for the hydraulic maximum pressure is adjustable.

3. Method according to claim 1 characterized in that when the pressure falls below the maximum pressure, the speed of the electric motor is increased to a normal speed through the operating pressure.

4. Method according to claim 1 characterized in that the speed of the electric motor is incrementally controlled.

5. Method according to claim 4 characterized in that the course of the speed control is variably adjustable.

6. Method according to claim 1 characterized in that the speed the electric motor is controlled by current control.

7. Method according to claim 6 characterized in that the speed is controlled by pulse-width modulation.

8. Method according to claim 1 characterized in that the steering rate is additionally determined and compared with a predefined limit value and that the speed of the electric motor is controlled only as long as the determined steering rate does not exceed the predefined limit value.

\* \* \* \* \*